United States Patent [19]
Ishizuka

[11] Patent Number: 5,933,267
[45] Date of Patent: Aug. 3, 1999

[54] ROTARY POLYGON MIRROR TYPE LIGHT DEFLECTOR

[75] Inventor: Yutaka Ishizuka, Nagano, Japan

[73] Assignee: Kabushiki Kaisha Sankyo Seiki Sisakusho, Nagano, Japan

[21] Appl. No.: 09/034,989

[22] Filed: Mar. 5, 1998

[30] Foreign Application Priority Data

Mar. 5, 1997 [JP] Japan ................................ 9-050084

[51] Int. Cl.⁶ ................................................ G02B 26/08
[52] U.S. Cl. ......................... 359/200; 359/198; 359/216
[58] Field of Search ................................ 359/198, 199, 359/200, 216, 217, 218, 219; 310/90.5; 384/107, 114

[56] References Cited

FOREIGN PATENT DOCUMENTS 6-165460   6/1994   Japan .............................. H02K 29/00

*Primary Examiner*—Cassandra Spyrou
*Assistant Examiner*—Euncha Cherry
*Attorney, Agent, or Firm*—Sughrue, Mion, Zinn, Macpeak & Seas, PLLC

[57] ABSTRACT

In a rotary polygon mirror type light deflector 1, since a ring-shaped polygon mirror 8 is mounted on the periphery of a bearing rotor 3, there exists a clearance between the bearing rotor 3 and polygon mirror 8. Even in this structure, if the leading end portion 110 of a fixing screw 11 is contacted with a wedge-shaped positioning member 12A within a groove 35 when the fixing screw 11 is threadedly engaged into the screw hole 35, then the positioning member 12A is allowed to push out the polygon mirror 8 toward the outer peripheral side thereof by an amount equivalent to the above-mentioned clearance, thereby being able to position and fix the polygon mirror 8 in the radial direction.

9 Claims, 4 Drawing Sheets

ROTARY POLYGON MIRROR TYPE LIGHT DEFLECTOR

BACKGROUND OF THE INVENTION

1. Field of the Invention

The present invention relates to a rotary polygon mirror type light deflector for use in a light scanning device in a laser printer and, in more particular, to a fixing structure for fixing a polygon mirror with respect to a rotary member.

2. Related Art

A rotary polygon mirror type light deflector for use in a light scanning device in a laser printer, as disclosed in Japanese Patent Publication No. 6-165460 of Heisei, basically includes a rotary member (a rotor) rotatable due a magnetic force generated between a drive coil and a drive magnet, and a ring-shaped polygon mirror mounted on the periphery of the rotary member. For example, as shown in FIG. 5, a rotary member 203 is fixed to a rotary shaft 202 supported to a plate-shaped stator 200 through a bearing 201 for a bearing holder, and a polygon mirror 204 is mounted on the periphery of the rotary member 203. The polygon mirror 204 is pressed against and fixed onto the rotary member 203 only by a plate-shaped mirror holder 205 mounted on the rotary member 203 from the thrust direction. On the upper surface side of the plate-shaped stator 200 and on the lower surface side of the rotary member 203, there are provided a drive coil 206 and a rotor magnet 207 respectively, while the polygon mirror 204 can be rotated integrally with the rotary member 203 due to a magnetic force generated between the drive coil 206 and rotor magnet 207.

However, like such fixing structure for fixing the polygon mirror 20 as shown in FIG. 5, in a fixing structure of a type that the polygon mirror 204 is mounted on the periphery of the rotary member 203, there is required a mounting clearance between the rotary member 203 and polygon mirror 204. In the conventional fixing structure, because the polygon mirror 204 is simply pressed against and fixed onto the rotary member 203 from the thrust direction by the mirror holder 205, the polygon mirror 204 is easy to be displaced in the radial direction on the rotary member 203. That is, in the conventional rotary polygon mirror type light deflector, when the polygon mirror 204 rotates at high speeds or when a strong shock is given to the rotary polygon mirror type light deflector, then there is a possibility that the polygon mirror 204 can be displaced in the radial direction on the rotary member 203 by an amount corresponding to the above-mentioned clearance. In particular, if such displacement of the polygon mirror 204 occurs, then there is a possibility that the whole of the rotary member including the rotary member 203 and polygon mirror 204 can lose its balance, with the result that the rotation of the polygon mirror 204 is caused to vary, one or more of the surfaces of the polygon mirror 204 can be inclined, and vibration noises can be generated. Further, undesirably, due to transmission of the vibration noises to the whole of the light scanning device, the printing performance of a printer can be lowered, the performance of the bearing 201 can be worsened, and the bearing 201 can be burned up.

SUMMARY OF THE INVENTION

Accordingly, the present invention aims at improving a fixing structure for fixing a polygon mirror with respect to a rotary member in a rotary polygon mirror type light deflector of a type that a ring-shaped polygon mirror is mounted on the periphery of a rotary member. Accordingly, it is an object of the invention to provide a fixing structure which is sure to prevent the polygon mirror on the rotary member from being displaced in the radial direction. As has been described heretofore, in the rotary polygon mirror type light deflector according to the invention, since the polygon mirror is mounted on the periphery of the rotary member, even when there exists a clearance between the rotary member and polygon mirror, if the leading end portion of the fixing screw is contacted with the positioning member when the fixing screw is threadedly engaged into the screw hole, then the positioning member is allowed to push away the ring-shaped polygon mirror toward the outer peripheral side thereof by an amount equivalent to the above-mentioned clearance. Therefore, when the positioning member pushes away the polygon mirror toward the outer peripheral side thereof, then the polygon mirror, due to its ring shape, is displaced until the opposite side of the polygon mirror is butted directly or indirectly against the rotary member, where the polygon mirror can be positioned and fixed.

According to the aspect of the present invention, there is provided a rotary polygon mirror type light deflector comprising: a rotary member rotatable due to a magnetic force generated between a drive coil and a drive magnet; a ring-shaped polygon mirror mountable on the outer periphery of said rotary member and including an inner peripheral surface; and a fixing screw threadedly engageable from the thrust direction of said rotary member into the portion of said rotary member that is located inside said inner peripheral surface of said polygon mirror, wherein said rotary member includes a screw hole for securing said fixing screw therein and a groove facing said inner peripheral surface of said polygon mirror and communicating with the bottom portion of said screw hole, and also wherein said rotary polygon mirror type light deflector further includes a positioning member disposed in said groove and structured such that, if the leading end portion of said fixing screw is contacted with said positioning member when said fixing screw is threadedly engaged into said screw hole, then it presses and energizes said inner peripheral surface of said polygon mirror toward the outer periphery side of said polygon mirror to thereby be able to position said polygon mirror in the radial direction thereof.

Thanks to this, even when the polygon mirror rotates at high speeds, or even when a strong shock is given to the rotary polygon mirror type light deflector, there is eliminated the possibility that the polygon mirror can be displaced in the radial direction on the rotary member. Thus, according to the present invention, the loss of balance of the whole rotary member caused by the displacement of the polygon mirror in the radial direction can be surely prevented; variations in the rotation of the polygon mirror, the inclined surface of the polygon mirror, and generation of vibration noises can be prevented; and, there is eliminated the possibility that the printing performance of a printer can be worsened due to transmission of such vibration noises to the whole of a light scanning device.

DETAILED DESCRIPTION OF THE PREFERRED EMBODIMENTS

Now, description will be given below of an embodiment of a rotary polygon mirror type light deflector according to the invention with reference to the accompanying drawings.

Embodiment 1

Figure 1:
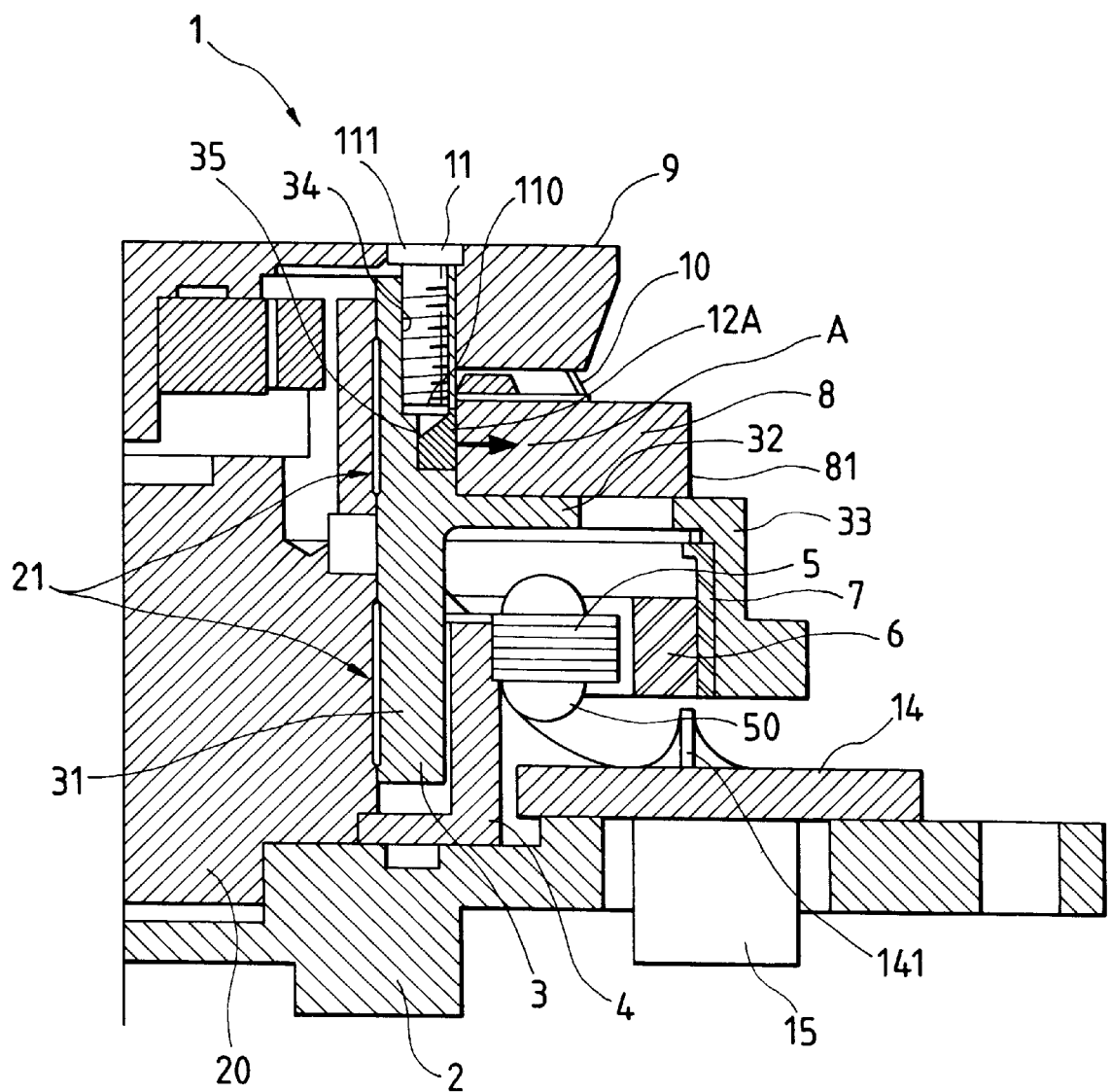
FIG. 1 is a patinally-section view of a schematic structure of a rotary polygon mirror type light deflector to which the present invention is applied.

Now, FIG. 1 is a patinally-section view of a general structure of a rotary polygon mirror type light deflector to which the invention is applied.

In a rotary polygon mirror type light deflector 1, a fixing shaft 20 is fixed to a plate-shaped motor frame 2 in an upright condition, while a bearing rotor 3 is rotatably supported on the fixing shaft 20. On the outer peripheral surface of the fixing shaft 20, there is formed a dynamic pressure generation groove 21 which generates dynamic pressure when the bearing rotor 3 (rotary member) rotates around the fixing shaft 20; and, the dynamic pressure generation groove 21 is also used to form a gas bearing. The bearing rotor 3 includes a cylindrical portion 31 with which the fixing shaft 20 is to be fitted, a disk portion 32 which projects out from the substantially central portion of the cylindrical portion 31 in the thrust direction, and an outer cylindrical portion 33 which extends out downwardly from the outer peripheral edge of the disk portion 32. A ring-shaped yoke 7 and a ring-shaped rotor magnet 6 are respectively fixed to the inner peripheral surface of the outer cylindrical portion 33 of the bearing rotor 3. On the other hand, in an interior portion which is enclosed by the cylindrical portion 31, disk portion 32 and outer cylindrical portion 33 of the bearing rotor 3, there is disposed a core holder 4 which is fixed to the fixing shaft 20 and motor frame 2. In the outer peripheral portion of the core holder 4, there is provided an armature core 5 in such a manner that it is opposed to the rotor magnet 6, while a drive coil 50 is wound around the armature core 5. The end portion of the drive coil 50 is wired and connected to the terminal 141 of a motor base plate 14 which is fixed to the top portion of the motor frame 2. To the lower surface side of the motor base plate 14, there is fixed a connector 15 which projects out downwardly from the motor frame 2. Therefore, if the drive coil 50 is electrically energized through the connector 15, then the bearing rotor 3 is rotated around the fixing shaft 20 due to a magnetic force which is generated between the drive coil 50 and rotor magnet 6.

In the present embodiment, a ring-shaped polygon mirror 8 is mounted on the periphery of the cylindrical portion 31 of the bearing rotor 3, while the polygon mirror 8 is situated on the disk portion 32 of the bearing rotor 3. In particular, the polygon mirror 8 has an outer shape such as a hexagonal outer shape, while each of the side surface portions 81 of the polygon mirror 8 is also formed in a mirror surface. In the peripheral direction of the cylindrical portion 31 of the bearing rotor 3, there are formed a plurality of screw holes 34 which respectively extend in the thrust direction from the upper surface portion of the cylindrical portion 31, while there are provided a plurality of fixing screws 11 which can be threadedly engaged with the plurality of screw holes 34 respectively; that is, if the fixing screws 11 are threadedly engaged with the screw holes 34 respectively, then the polygon mirror 8 can be held on the rotor 3.

In other words, on the upper surface side of the polygon mirror 8, there is disposed a mirror hold spring 10 which consists of a ring-shaped plate spring, while the mirror hold spring 10 is covered with a mirror hold cap 9. The mirror hold cap 9 is pushed downwardly by the screw head 111 of a fixing screw 11, whereby the mirror hold cap 9 is fixed to the upper end portion of the rotor 3 and holds the polygon mirror 8 between the disk portion 32 of the bearing rotor 3 and itself through the mirror hold spring 10. In this manner, the polygon mirror 8 is positioned in the thrust direction with respect to the bearing rotor 3.

Figure 2A:
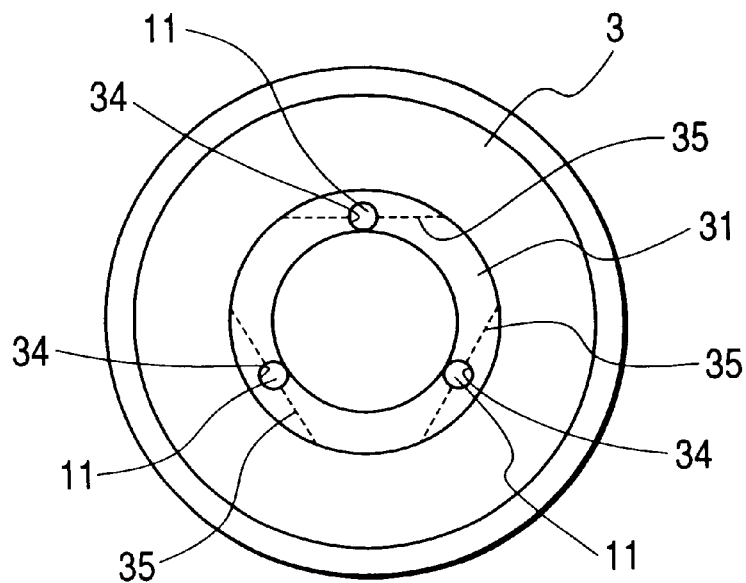
FIG. 2 (A) is a schematic plan view of a bearing rotor employed in a rotary polygon mirror type light deflector according to a first embodiment of the invention, showing its portion for positioning a polygon mirror with respect to the bearing rotor; and, FIG. 2 (B) is a schematic plan view of a bearing rotor employed in a rotary polygon mirror type light deflector according to a second embodiment of the invention, showing its portion for positioning a polygon mirror with respect to the bearing rotor.
Figure 2B:
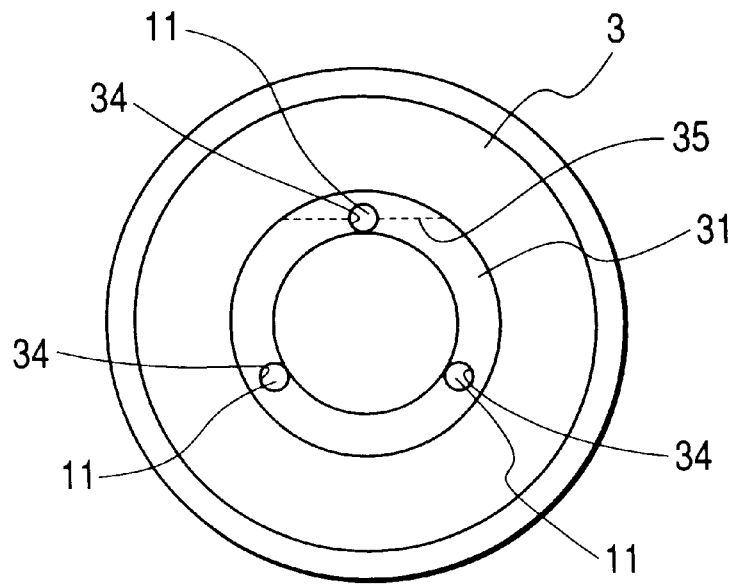

Further, in the present embodiment, the polygon mirror 8 is positioned in the radial direction as well with respect to the bearing rotor 3 in the following manner. At first, at positions which are respectively situated on the outer peripheral side of the cylindrical portion 31 of the bearing rotor 3 and correspond to the leading end portions of the screw holes 34, there are formed a plurality of grooves 35. Due to this, when the polygon mirror 8 is mounted on the cylindrical portion 31 of the bearing rotor 3, then the inner peripheral surface of the polygon mirror 8 is so disposed as to face the grooves 35. Here, referring to the number of the screw holes 34, as shown in FIG. 2 (A) which illustrates a plan view of the bearing rotor 3, three screw holes 34 are formed in the cylindrical portion 31 of the bearing rotor 3 at regular angular intervals, while three mutually independent grooves 35 are formed in such a manner that they respectively correspond to the three screw holes 34.

Figure 3:
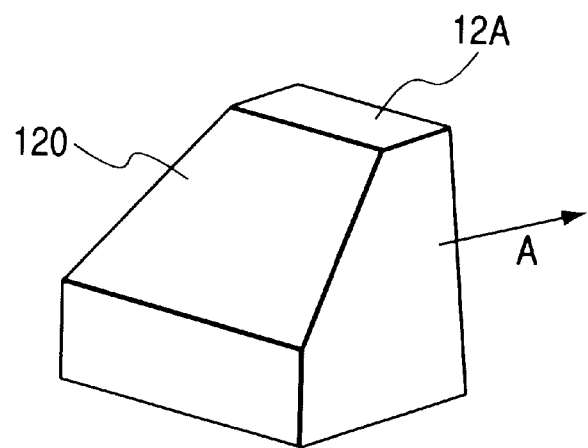
FIG. 3 is a perspective view of, in the rotary polygon mirror type light deflectors respectively according to the first and second embodiments of the invention, a wedge-shaped positioning member which is used to position the polygon mirror.

Here, in each of the grooves 35, as shown in FIG. 1, there is disposed a positioning member 12A which can be contacted by the screw leading end portion 110 of the fixing screw 11 when the fixing screw 11 is threadedly engaged into the screw hole 34 to thereby apply a force which pushes out the polygon mirror 8, as shown by an arrow A, toward the outer peripheral side thereof through the inner peripheral surface of the polygon mirror 8. As this positioning member 12A, in accordance with the present embodiment, as shown in FIG. 3, there is used a wedge-shaped positioning member 12A which includes an inclined surface 120 decreasing in height inwardly in the radial direction, while the inclined surface 120 is located in the portion of the positioning member 12A with which the leading end portion 110 of the fixing screw 11 can be contacted. Due to this, after the polygon mirror 8 is mounted on the cylindrical portion 31 of the bearing rotor 3 with the positioning members 12A positioned in their respective grooves 35, if the fixing screws 11, as described above, are threadedly engaged into their respective screw holes 34 sequentially to thereby hold the polygon mirror 8 by and between the mirror hold cap 9 and the disk portion 31 of the bearing rotor 3 through the mirror hold screw 10, then the leading end portions 110 of the fixing screws 11 are contacted with the inclined surfaces 120 of the wedge-shaped positioning members 12A in every grooves 35, so that, as shown by the arrow A, the wedge-shaped positioning members 12A are going to move out of place or be displaced toward the outer peripheral sides thereof. As a result of this, the positioning members 12A are allowed to push out the polygon mirror 8 toward the outer peripheral side thereof by an amount corresponding to a clearance existing between the polygon mirror 8 and the cylindrical portion 31 of the bearing rotor 3. That is, since the polygon mirror 8 has a ring shape, if one side of the inner peripheral surface of the ring-shaped polygon mirror 8 is pushed, then the opposite side thereof is butted against the cylindrical portion 31 of the bearing rotor 3 through the wedge-shaped positioning members 12A situated there, thereby being able to position the polygon mirror 8 in the radial direction.

As described above, in the rotary polygon mirror type light deflector 1, since the polygon mirror 8 is mounted on the periphery of the cylindrical portion 31 of the bearing rotor 3, there is present a clearance between the outer peripheral surface of the cylindrical portion 31 of the bearing rotor 3 and the inner peripheral surface of the polygon mirror 8. However, in accordance with the present embodiment, when the fixing screws 11 are threadedly engaged into their respective screw holes 34, the leading end portions 110 of the fixing screws 11 are respectively contacted with the wedge-shaped positioning members 12A within the respective grooves 35, with the result that the three wedge-shaped positioning members 12A respectively push out the ring-shaped polygon mirror 8 toward the outer peripheral side thereof to be thereby able to position and fix the polygon mirror 8. Accordingly, even when the polygon mirror 8 rotates at high speeds, or even when a strong shock is given to the rotary polygon mirror type light deflector 1, the polygon mirror 8 is prevented from moving out of place or being displaced in the radial direction on the cylindrical portion 31 of the bearing rotor 3. Thanks to this, the present embodiment is surely able to prevent the whole of the bearing rotor 3 from losing its balance due to the displacement of the polygon mirror 8 in the radial direction, prevent the polygon mirror 8 from varying in the rotation speed thereof and from generating vibration noises, and thus can eliminate the possibility that the printing performance of a printer can be lowered due to transmission of such vibration noises to the whole of the light scanning device.

Also, according to the present embodiment, since the portions of the rotary polygon mirror type light deflector 1 that are used to position the rotary polygon mirror type light deflector 1, that is, the screw holes 34 and grooves 35 are disposed at equal angular intervals, the bearing rotor 3 is easy to keep its balance as a whole.

Further, according to the present embodiment, the wedge-shaped positioning member 12A, bearing rotor 3 and polygon mirror 8 may be formed of different materials. However, if the wedge-shaped positioning member 12A, bearing rotor 3 and polygon mirror 8 are formed of materials having coefficients of thermal expansion equivalent to one another, for example, they are all formed of aluminum, then there can be obtained an advantage that, because they are equivalent in the coefficients of thermal expansion, even if temperatures vary, the balance of the bearing rotor 3 can be kept well as a whole. Still further, if the fixing screws 11 are so formed as to be equivalent in the coefficients of thermal expansion to the positioning members 12A and bearing rotor 3, then there is also provided an advantage that, even if temperatures vary, the balance of the bearing rotor 3 can be kept well as a whole because the fixing screws 11 are prevented from being loosened or tightened.

Embodiment 2

In positioning the polygon mirror 8 in the radial direction with respect to the bearing rotor 3, there may be employed another structure; for example, as shown in FIG. 2 (B), a single groove 35 is formed with respect to only one of the three screw holes 34 which have been formed at equal angular intervals in the cylindrical portion 31 of the bearing rotor 3, and the positioning member 12A is disposed in the single groove 35. Even with use of this structure, when the leading end portion 110 of the fixing screw 11 is contacted with the inclined surface 12A0 of the wedge-shaped positioning member 12A, the positioning member 12A is going to move out of place or be displaced toward the outer peripheral side thereof, with the result that the positioning member 12A is allowed to push out the polygon mirror toward the outer peripheral side thereof by an amount equivalent to the clearance between the polygon mirror 8 and the cylindrical portion 31 of the bearing rotor 3. That is, since the polygon mirror 8 has a ring shape, if the portion of the polygon mirror 8 pushed by the wedge-shaped positioning member 12A is pushed out toward the outer peripheral side thereof, then the opposite portion of the polygon mirror 8 is butted against the cylindrical portion 31 of the bearing rotor 3, thereby being able to position the polygon mirror 8 in the radial direction with respect to the bearing rotor 3.

By the way, according to the present embodiment, because the single groove 35 is formed at one position as well as the positioning member 12A is disposed at one position, if the balance of the whole of the bearing rotor 3 is adjusted once in the initial design stage thereof or after it is assembled, then there is no possibility that, after then, the bearing rotor 3 can lose its balance as a whole.

Embodiment 3

In the above-mentioned embodiments 1 and 2, as the positioning member, there is used a hard wedge-shaped member which is formed of metal or the like, for example, a wedge-shaped member formed of aluminum. However, instead of this, a positioning member formed of an elastic material may be disposed in such groove 35 as shown in FIGS. 2 (A) and (B). In this case, if the leading end portion 110 of the fixing screw 11 is contacted with the positioning member formed of an elastic material, then the elastic material is elastically deformed within the groove 35 to thereby push away the polygon mirror 8 toward the outer peripheral side thereof. This makes it possible to position the polygon mirror 8 in the radial direction on the bearing rotor 3.

Embodiment 4

Figure 4A:
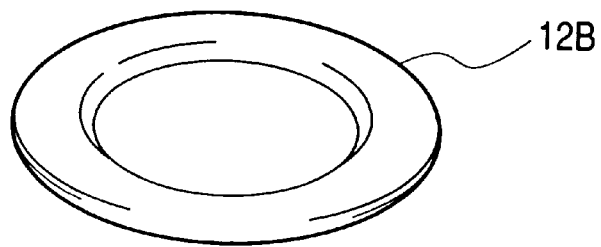
FIG. 4 (A) is a perspective view of, in a rotary polygon mirror type light deflector according to a fourth embodiment of the invention, a rubber-ring-shaped positioning member which is used to position the polygon mirror; and, FIG. 4 (B) is a schematic plan view of a bearing rotor used in the present rotary polygon mirror type light deflector.
Figure 4B:
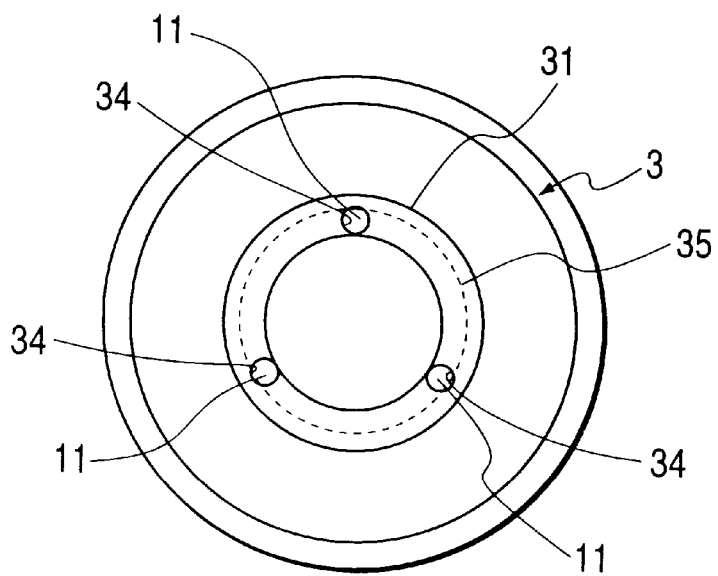
Figure 5:
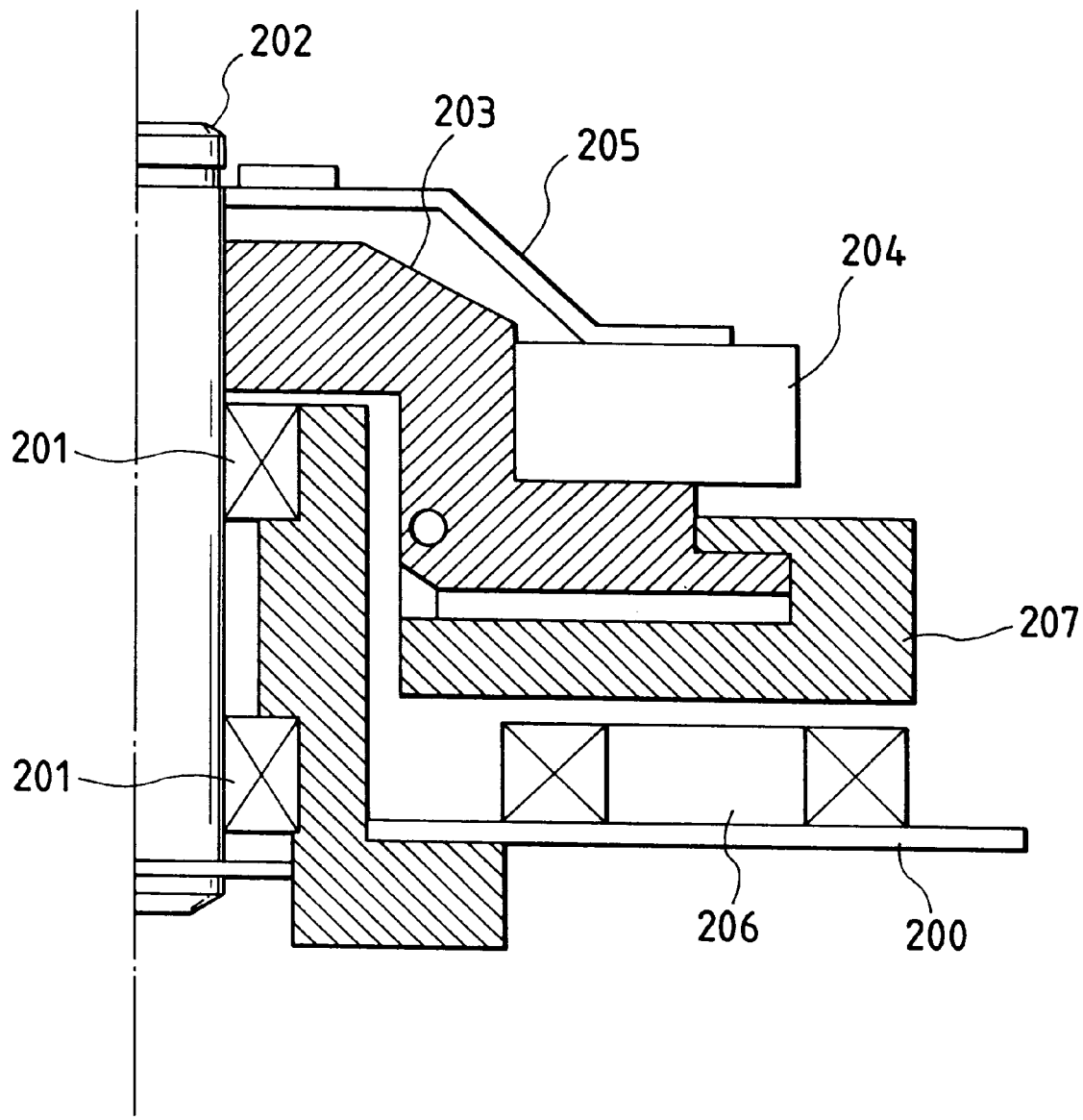
FIG. 5 is a patinally-section view of a schematic structure of a conventional rotary polygon mirror type light deflector.

Now, FIGS. 4 (A) and (B) are respectively a schematic plan view of a bearing rotor used in a rotary polygon mirror type light deflector according to a fourth embodiment of the invention, and a perspective view of a positioning member which is used to position a polygon mirror mounted on the bearing rotor in the radial direction. However, since the rotary polygon mirror type light deflector according to the fourth embodiment of the invention is similar in basic structure to the previously described first embodiment, the parts of the fourth embodiment corresponding to those of the first embodiment are given the same designations and thus the detailed description thereof is omitted here.

In the rotary polygon mirror type light deflector according to the present embodiment as well, as has been described in the first embodiment with reference to FIG. 1, a ring-shaped polygon mirror 8 is mounted on the periphery of a bearing rotor (a rotary member) which can be rotated due to a magnetic force generated between a drive coil 50 and rotor magnet 6; and, at the same time, the polygon mirror 8 is positioned in the thrust direction in the disk portion 32 of the bearing rotor 3 by means of a fixing screw 11, a mirror hold cap 9 and a mirror hold spring 10.

Also, according to the present embodiment, by use of a ring-shaped positioning member 12B which is formed of an elastic material such as rubber or the like and is shown in FIG. 4 (A), the polygon mirror 8 is positioned in the radial direction with respect to the bearing rotor 3. That is, as shown in FIG. 1, in the portion of the bearing rotor 3 that corresponds to the leading end portion of a screw hole 34, there is opened up a groove 35 from the outer peripheral side of the cylindrical portion of the bearing rotor 3, while the ring-shaped positioning member 12B shown in FIG. 4 (A) is fitted into the groove 35 portion of the bearing rotor 3. Here, the groove 35, as shown in FIG. 4 (B), is a peripheral groove that is so formed as to extend over the whole periphery of the cylindrical portion 31 of the bearing rotor 3. Therefore, after the ring-shaped positioning member 12B is fitted into the groove 35, if the polygon mirror 8 is mounted on the cylindrical portion 31 of the bearing rotor 3 and, after then, as described above, if the fixing screw 11 is threadedly engaged into the screw hole 34 to thereby fix the polygon mirror 8, then the leading end portion 110 of the fixing screw 11 elastically deforms the positioning member 12B within the groove 35.

As a result of this, the positioning member 12B applies a force which pushes away the polygon mirror 8 toward the outer peripheral side thereof by an amount equivalent to the clearance between the polygon mirror 8 and the cylindrical portion 31 of the bearing rotor 3. Such force is similarly applied in all of the three portions of the periphery of the cylindrical portion of the bearing rotor 3 in which the three screw holes 34 are respectively formed. Thanks to this, the polygon mirror 8 can be positioned and fixed in the radial direction on the cylindrical portion 31 of the bearing rotor 3, which prevents the polygon mirror 8 from being displaced in the radial direction.

As has been described heretofore, in the rotary polygon mirror type light deflector according to the invention, since the polygon mirror is mounted on the periphery of the rotary member, even when there exists a clearance between the rotary member and polygon mirror, if the leading end portion of the fixing screw is contacted with the positioning member when the fixing screw is threadedly engaged into the screw hole, then the positioning member is allowed to push away the ring-shaped polygon mirror toward the outer peripheral side thereof by an amount equivalent to the above-mentioned clearance. Therefore, when the positioning member pushes away the polygon mirror toward the outer peripheral side thereof, then the polygon mirror, due to its ring shape, is displaced until the opposite side of the polygon mirror is butted directly or indirectly against the rotary member, where the polygon mirror can be positioned and fixed. Thanks to this, even when the polygon mirror rotates at high speeds, or even when a strong shock is given to the rotary polygon mirror type light deflector, there is eliminated the possibility that the polygon mirror can be displaced in the radial direction on the rotary member. Thus, according to the present invention, the loss of balance of the whole rotary member caused by the displacement of the polygon mirror in the radial direction can be surely prevented; variations in the rotation of the polygon mirror, the inclined surface of the polygon mirror, and generation of vibration noises can be prevented; and, there is eliminated the possibility that the printing performance of a printer can be worsened due to transmission of such vibration noises to the whole of a light scanning device.

What is claimed is:

1. A rotary polygon mirror type light deflector comprising:

a rotary member rotatable due to a magnetic force generated between a drive coil and a drive magnet;

a ring-shaped polygon mirror mounted on the outer periphery of said rotary member and including an inner peripheral surface; and, a fixing screw threadedly engageable from the thrust direction of said rotary member into a portion of said rotary member that is located inside said inner peripheral surface of said polygon mirror, a screw hole, provided on said rotary member, for securing said fixing screw therein;

a groove, provided on said rotary member, facing said inner peripheral surface of said polygon mirror and communicating with the bottom portion of said screw hole; and a positioning member disposed in said groove in such a manner that, when the leading end portion of said fixing screw is contacted with said positioning member while said fixing screw is threadedly engaged into said screw hole, said positioning member presses and energizes said inner peripheral surface of said polygon mirror toward the outer periphery side of said polygon mirror to thereby be able to position said polygon mirror in the radial direction thereof.

2. A rotary polygon mirror type light deflector as set forth in claim 1, further comprising:

fixing member pushed in said thrust direction by the head portion of said fixing screw, when said fixing screw is threadedly engaged, to thereby press and fix from said thrust direction said polygon mirror with respect to said rotary member.

3. A rotary polygon mirror type light deflector as set forth in claim 1, wherein said positioning member is a wedge-shaped member including an inclined surface decreasing in height inwardly in the radial direction thereof at a portion contacted with said leading end portion of said fixing screw.

4. A rotary polygon mirror type light deflector as set forth in claim 1, wherein said positioning member, said rotary member, and said polygon mirror are respectively formed of materials equivalent in the coefficients of thermal expansion to one another.

5. A rotary polygon mirror type light deflector as set forth in claim 1, wherein said positioning member is an elastic member which is deformed elastically within said groove to thereby press and energize said inner peripheral surface of said polygon mirror toward the outer periphery side thereof when said leading end portion of said fixing screw is contacted with said positioning member.

6. A rotary polygon mirror type light deflector as set forth in claim 1, wherein said rotary member includes a plurality of said screw holes formed at equal intervals in the peripheral direction thereof.

7. A rotary polygon mirror type light deflector as set forth in claim 6, wherein, in at least one of said screw holes, said groove and said positioning member are disposed.

8. A rotary polygon mirror type light deflector as set forth in claim 1, wherein said groove is a peripheral groove formed over the whole periphery of said rotary member, and said positioning member is formed in a ring-like shape and engaged with said peripheral groove.

9. A rotary polygon mirror type light deflector as set forth in claim 8, wherein said positioning member is composed of an elastic member having an elastic property.

* * * * *